United States Patent
Lee et al.

(10) Patent No.: US 9,797,549 B2
(45) Date of Patent: Oct. 24, 2017

(54) HOOK ASSEMBLY

(71) Applicant: STI CO., LTD., Bucheon (KR)

(72) Inventors: Chang-Yong Lee, Hwaseong (KR); Jae-Seung Jin, Seongnam (KR)

(73) Assignee: STI CO., LTD., Bucheon-si (KR)

( * ) Notice: Subject to any disclaimer, the term of this patent is extended or adjusted under 35 U.S.C. 154(b) by 0 days.

(21) Appl. No.: 15/036,436

(22) PCT Filed: Nov. 19, 2013

(86) PCT No.: PCT/KR2013/010510
§ 371 (c)(1),
(2) Date: May 13, 2016

(87) PCT Pub. No.: WO2015/072606
PCT Pub. Date: May 21, 2015

(65) Prior Publication Data
US 2016/0290555 A1    Oct. 6, 2016

(30) Foreign Application Priority Data
Nov. 15, 2013    (KR) .......................... 10-2013-0139020

(51) Int. Cl.
| | |
|---|---|
| *F16B 47/00* | (2006.01) |
| *F16M 13/02* | (2006.01) |
| *A47G 1/17* | (2006.01) |
| *F16B 2/10* | (2006.01) |
| *F16B 45/00* | (2006.01) |

(52) U.S. Cl.
CPC .......... *F16M 13/022* (2013.01); *A47G 1/175* (2013.01); *F16B 2/10* (2013.01); *F16B 45/00* (2013.01)

(58) Field of Classification Search
USPC ....................................................... 248/205.3
See application file for complete search history.

(56) References Cited

U.S. PATENT DOCUMENTS

| | | | | | |
|---|---|---|---|---|---|
| 2,893,676 | A | * | 7/1959 | Connors ................. | A47K 1/08 248/222.14 |
| 3,848,843 | A | * | 11/1974 | Levy ...................... | A47G 29/08 248/224.51 |
| 4,756,498 | A | * | 7/1988 | Frye ....................... | F16B 47/003 248/205.3 |
| 4,826,119 | A | * | 5/1989 | Gresens ................. | A47K 10/10 248/223.31 |
| 4,923,159 | A | * | 5/1990 | Wang ..................... | A47G 1/20 248/205.3 |
| 5,046,696 | A | * | 9/1991 | Lee ........................ | A47F 7/021 248/205.3 |

(Continued)

FOREIGN PATENT DOCUMENTS

| | | |
|---|---|---|
| JP | 2004-057456 | 2/2004 |
| KR | 20-0410339 | 2/2006 |

(Continued)

*Primary Examiner* — Monica Millner
(74) *Attorney, Agent, or Firm* — Lex IP Meister, PLLC

(57) ABSTRACT

A hook assembly is convenient for use and is easily detached from a bonded surface. The hook assembly includes a hook including a hook part containing a hook member on which an object is hung to be supported thereby and an attachment part attaching the hook part to a bonded surface, and an adhesive tape attaching the attachment part to the bonded surface.

19 Claims, 20 Drawing Sheets

(56) References Cited

U.S. PATENT DOCUMENTS

| | | | | |
|---|---|---|---|---|
| 5,433,413 | A * | 7/1995 | Adams | A47G 1/17 248/205.3 |
| 5,507,464 | A * | 4/1996 | Hamerski | A47G 1/175 248/205.3 |
| 6,106,937 | A * | 8/2000 | Hamerski | A47G 1/175 248/205.3 |
| 6,187,404 | B1 * | 2/2001 | Schumann | A47G 1/175 248/205.3 |
| 6,431,500 | B1 * | 8/2002 | Jacobs | F16L 3/13 24/129 R |
| 6,835,452 | B1 * | 12/2004 | Hamerski | C09J 7/02 248/205.3 |
| 2003/0047654 | A1 * | 3/2003 | Johansson | A47G 1/175 248/205.3 |
| 2004/0188580 | A1 * | 9/2004 | Ryu | A47G 1/175 248/304 |
| 2007/0257165 | A1 * | 11/2007 | Newbould | A47G 1/175 248/205.3 |
| 2007/0295436 | A1 * | 12/2007 | Joseph | A47G 1/17 156/60 |
| 2009/0205784 | A1 * | 8/2009 | Sudo | A47G 1/175 156/391 |
| 2009/0242712 | A1 * | 10/2009 | Thompson | A47G 1/175 248/221.11 |
| 2009/0321595 | A1 * | 12/2009 | Conway | G09F 3/204 248/205.3 |
| 2010/0314511 | A1 * | 12/2010 | Hutter, III | F16B 11/006 248/205.3 |
| 2012/0032043 | A1 * | 2/2012 | McGreevy | A47G 1/175 248/205.3 |
| 2012/0145847 | A1 * | 6/2012 | Wang | A47G 1/17 248/205.3 |
| 2012/0153102 | A1 * | 6/2012 | Thompson | A47G 1/175 248/205.3 |
| 2013/0083507 | A1 * | 4/2013 | Guirlinger | F16M 13/00 361/809 |

FOREIGN PATENT DOCUMENTS

| | | |
|---|---|---|
| KR | 20-2010-0005394 | 5/2010 |
| KR | 10-1102046 | 1/2012 |
| KR | 20-2012-0008481 | 12/2012 |

* cited by examiner

HOOK ASSEMBLY

CROSS-REFERENCE TO RELATED APPLICATION

This application claims the priority of Korean Patent Application No. 10-2013-0139020 filed on Nov. 15, 2013, in the Korean Intellectual Property Office, the disclosure of which is incorporated herein by reference.

BACKGROUND

Field of the Invention

The present disclosure relates to a hook assembly, and more particularly, to a hook assembly convenient for use and capable of being easily separated from a bonded surface.

Description of the Related Art

In order to hang keys, small articles, cloths or the like on a certain projecting element at homes, businesses or other venues, projecting nails are used by driving in nails into a wall or hooks are used by attaching hooks to a wall. Ends of hooks are bent such that a user may hang objects such as keys and the like thereon. As a method of fixedly attaching a hook to a wall, a method of driving a nail in a wall and fixedly hanging a hook thereon or a method of attaching a tape to a rear surface of a hook to then be attached to the wall are present.

Thereamong, the method of fixing a hook by driving in a nail has an advantage in that the hook may be firmly fixed and may support heavy articles, but a wall surface may be damaged, and particularly to a beginner, a user may suffer injuries while driving a nail in a wall. Unlike that, the method of fixing a hook by bonding a tape to a rear surface of the hook has negative characteristics that the weight of articles able to be supported thereby may be changed depending on adhesive strength of the tape, while this method has positive characteristics that the hook may be easily fixed without the damage to a wall surface.

In recent, as an adhesive for an adhesive tape used to fix a hook, a pressure sensitive adhesive (PSA) has been used much. When a PSA adhesive is used, ease of adhesion is provided and adhesive strength is maintained for a predetermined time, and in a case in which the attached hook is no longer required later and the separation of the tape from a wall surface is required and performed, residuals on or damage to the wall surface may be reduced. The separated hook may be reused by re-attaching an adhesive tape to be attached to other walls or the like.

However, in the case of an easy separation of a hook obtained by only lowering adhesive strength of an adhesive tape as in a PSA adhesive, the lower adhesive strength of the adhesive tape is continuously, the easier the separation of the hook is. In this case, the weight of objects able to be hung is relatively limited. Therefore, the development of a technology for easily separating a hook from a wall surface or the like while securing adhesive strength of an adhesive tape is in demand.

SUMMARY

Some embodiments of the present disclosure may provide a hook assembly convenient for use and capable of being easily detached from a bonded surface.

According to some embodiments of the present disclosure, a hook assembly may include a hook including a hook part containing a hook member on which an object is hung to be supported thereby and an attachment part attaching the hook part to a bonded surface; and an adhesive tape attaching the attachment part to the bonded surface.

An upper end of the adhesive tape may be fixed to the hook part, and the adhesive tape may be detached from the bonded surface when the hook part is moved in a first direction.

The hook part may include a saw-toothed part, the attachment part may include a first gear having a shape engaging with the saw-toothed part and a second gear operated by the first gear, and an upper end of the adhesive tape may be fixed to a shaft of the second gear. The adhesive tape may be wound around the shaft of the second gear when the hook part is moved in the first direction to operate the second gear by the first gear engaging with the saw-toothed part, to then be detached from the bonded surface. When the hook part is moved in the first direction and then stopped, the hook part may move in a second direction, and when the hook part is moved in the second direction and then stopped, the hook part may re-move in the first direction. The shaft of the second gear may be stopped by a stop part as the hook part is moved in the first direction and then stopped, and may maintain a stop state thereof until the hook part is moved in the second direction and then stopped. The hook part may move until the adhesive tape is detached from the bonded surface.

The hook part may be fastened to the attachment part using a hinge, and the hook part may move around the hinge to allow for a lower end of the hook part to be separated from the bonded surface. The attachment part may be formed to expose a portion of the adhesive tape to the outside when the hook part is moved.

The hook part may be provided with a protrusion formed on a side of the hook part, and when force is applied to the protrusion, a portion or the entirety of the hook part may be separated from the bonded surface. The attachment part may be provided to expose a portion of the adhesive tape to the outside when the hook part is separated from the bonded surface, The hook member may be a clip-type hook, and the hook member may be converted into a hook-type member when the clip-type hook is spread.

The hook may further include an auxiliary hook part provided with a peg formed on a first end portion of the auxiliary hook part, the auxiliary hook part may be disposed between the hook part and the attachment part, and at least one of the attachment part and the hook part may be fastened to a second end port of the auxiliary hook part through a hinge. In the case of the auxiliary hook part, when the auxiliary hook part rotatably moves based on the second end portion, the first end portion may be spread aside. The auxiliary hook part may be disposed between the attachment part and the hook part when the spread first end portion is rotatably moved based on the second end portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
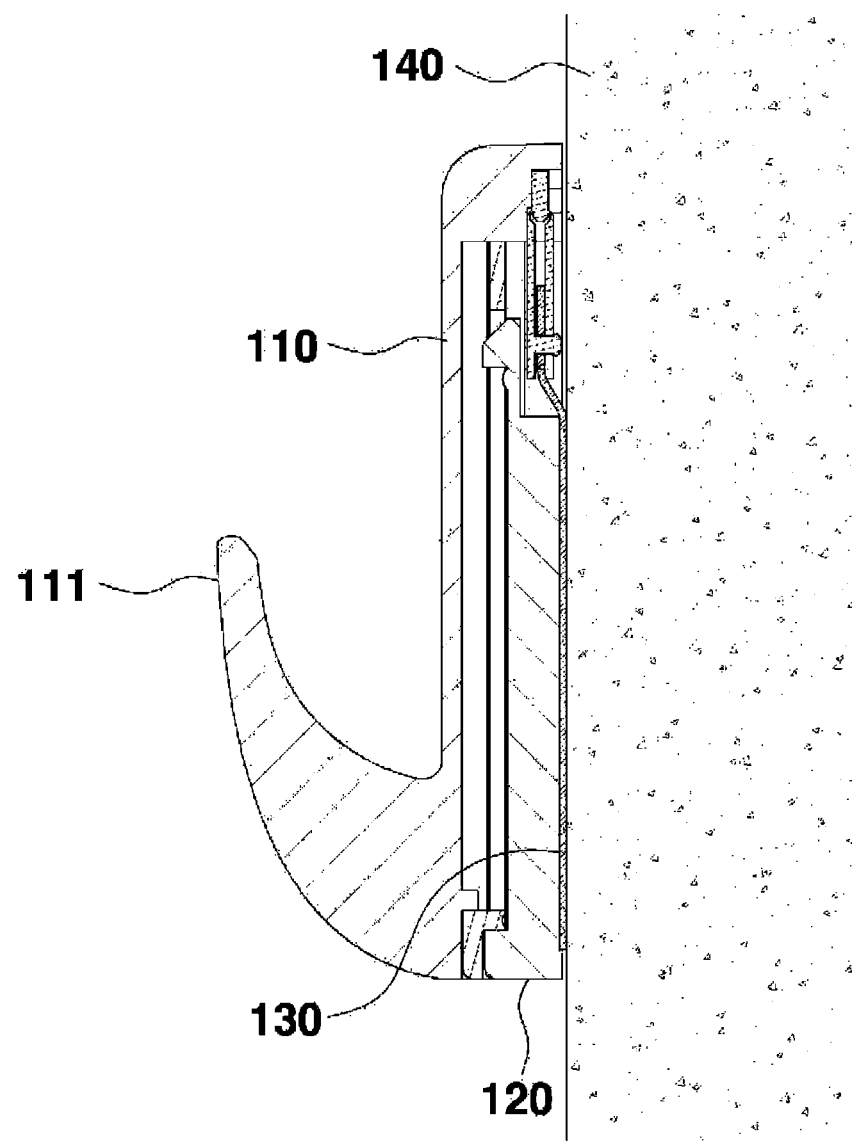
FIG. 1 illustrates a longitudinal cross section of a hook assembly according to an exemplary embodiment of the present disclosure.

Hereinafter, some embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

A hook assembly according to an exemplary embodiment of the present disclosure may include a hook including a hook part containing a hook member on which an object is hung to be supported thereby and an attachment part attaching the hook part to a bonded surface; and an adhesive tape attaching the attachment part to the bonded surface.

The hook assembly may include a hook containing a hook part provided with a hook member on which an object is hung on an end thereof to be supported, and an attachment part combined with the hook part to be positioned on a bonded surface. In addition, the hook according to the exemplary embodiment of the present disclosure may be attached to a bonded surface using an adhesive tape formed by applying an adhesive to an entire surface or a portion of one surface, or an entire surface or a portion of both surfaces of the adhesive tape, so as to be attached to the attachment part and thus be able to attach the hook to a bonded surface such as a wall surface or a side portion of furniture.

The adhesive tape may be formed by applying an adhesive to one surface or both surfaces of a film such as a plastic film. As the adhesive, a pressure sensitive adhesive (PSA) may be used, and when the PSA is used, the adhesive tape may be easily removed as necessary.

Figure 2:
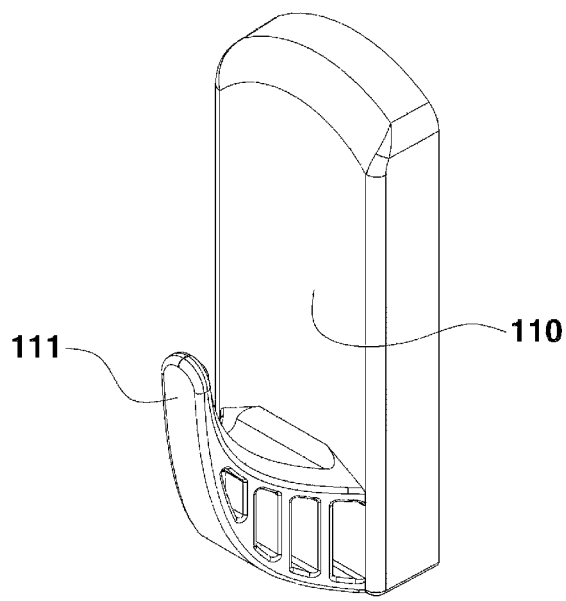
FIG. 2 is a perspective view of the hook assembly of FIG. 1.

FIG. 1 illustrates a longitudinal cross section of a hook assembly according to an exemplary embodiment of the present disclosure, and FIG. 2 is a perspective view of the hook assembly illustrated in FIG. 2. A hook assembly 100 according to an exemplary embodiment of the present disclosure may include a hook including a hook part 110 containing a hook member 111 on which an object is hung to be supported thereby and an attachment part 120, and an adhesive tape 130 attaching the hook to a bonded surface 140.

The hook member 111 on which an object is hung or supported thereby may be implemented in a form in which an end width thereof is narrowed while being bent upwardly in the case of the hook assembly 100 attached to the bonded surface as in the exemplary embodiment of the present disclosure. With reference to FIG. 2, openings for the improvement of durability may be formed in a side of the hook member 111.

Figure 3:
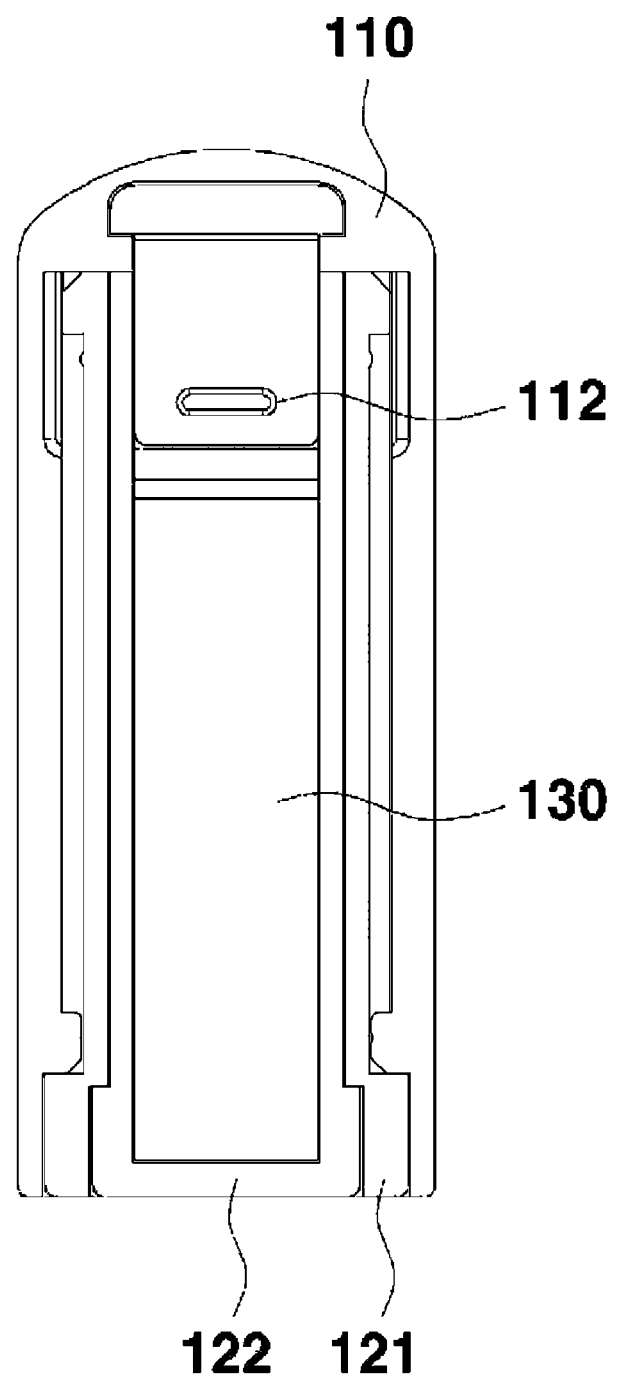
FIG. 3 is a view illustrating an adhesive tape of the hook assembly of FIG. 1.

FIG. 3 illustrates an adhesive tape of the hook assembly of FIG. 1. In FIG. 3, a remaining portion of the hook assembly except for an upper plate on which the hook member 111 of the hook part 110 is located is illustrated. For example, the adhesive tape 130 attached to the bonded surface 140 provided by removing the upper plate from the hook part 110 is illustrated. The attachment part 120 may include a first attachment portion 121 and a second attachment portion 122 as illustrated in FIG. 3.

The adhesive tape 130 may be fixed to the hook part 110 by a fixing portion 112. An upper end of the adhesive tape 130 may be fixed to the hook part 110 and a lower end of the adhesive tape 130 may be attached to the bonded surface 140. The adhesive tape 130 is detachable depending on the movement of the hook part 110.

Figure 4:
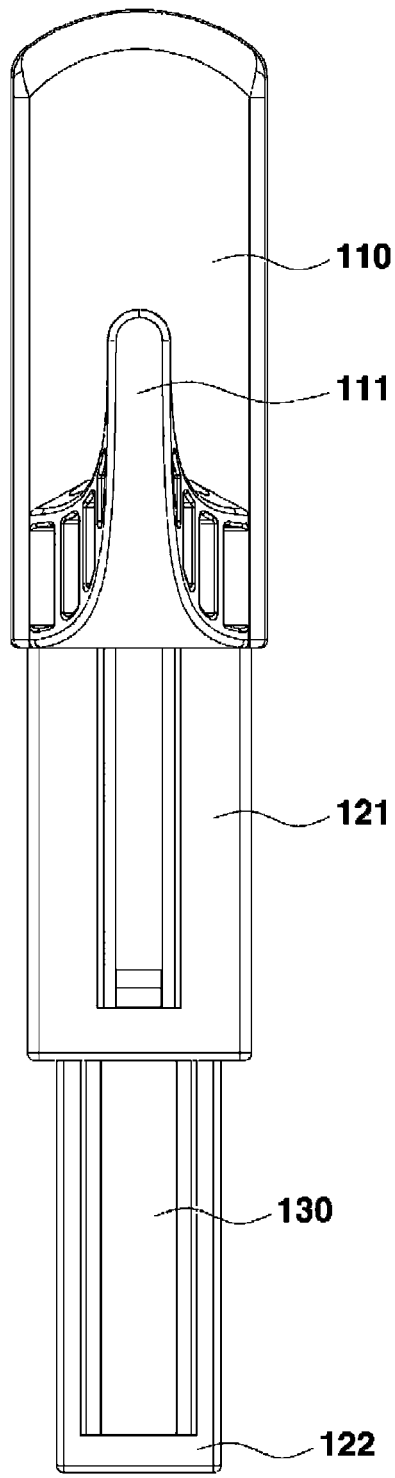
FIG. 4 is a plan view illustrating an operation of the hook assembly of FIG. 1.

FIG. 4 is a plan view illustrating an operation of the hook assembly of FIG. 1. For example, the adhesive tape 130 may be attached to the bonded surface 140 together with the second attachment portion 122, the first attachment portion 121 may be located thereon, and the hook part 110 may be located at an uppermost portion thereof. FIG. 4 illustrates a form in which the hook part 110 of the hook assembly 100 is moved upwardly. For example, in the case of the hook assembly 100, when the hook part 110 is moved upwardly, first, the first attachment portion 121 directly connected to the hook part 110 may be moved upwardly together with the hook part 110. When exposure of the first attachment portion 121 is completed by the upward movement of the hook part 110, the first attachment portion 121 begins to move upwardly to expose the second attachment portion 122 together with exposure of the adhesive tape 130.

Figure 5:
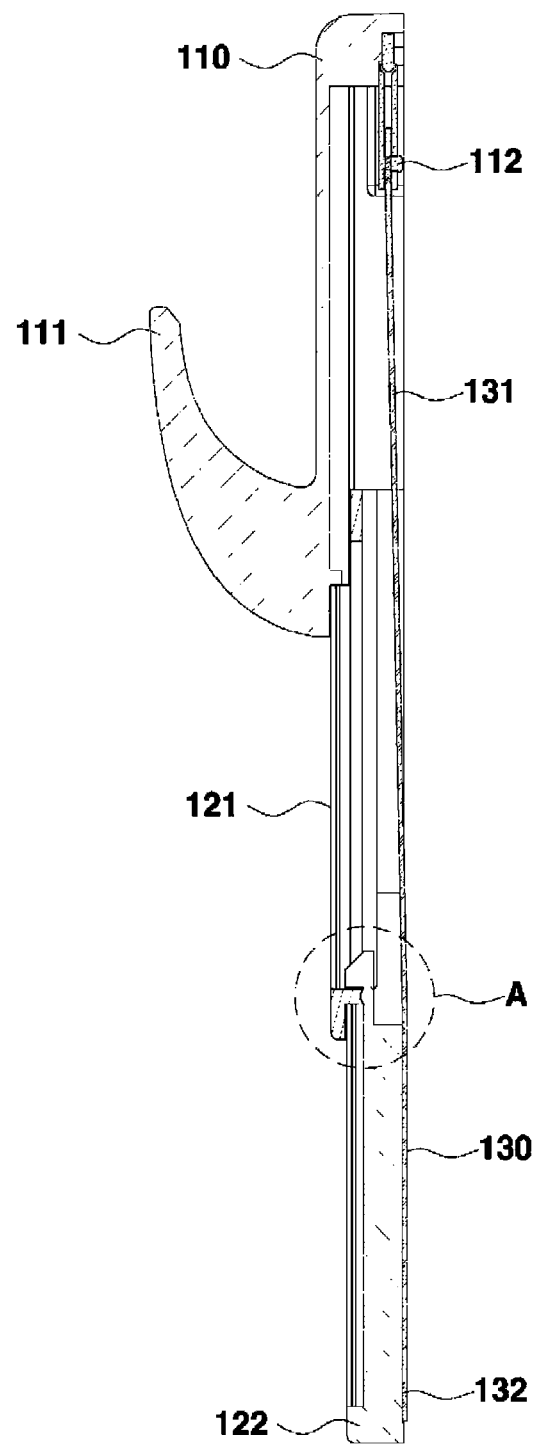
FIG. 5 illustrates a longitudinal cross section of the hook assembly of FIG. 4.

FIG. 5 illustrates a longitudinal cross section of the hook assembly of FIG. 4. In FIG. 5, an upper end 131 of the adhesive tape is fixed to the hook part 110 by the fixing portion 112, and a lower end 132 of the adhesive tape is attached to the bonded surface. The first attachment portion 121 is moved according to the movement of the hook part 110, and the first attachment portion 121 may be moved together with the movement of the hook part 110 until the coupling thereof to the second attachment portion 122 as illustrated in A of FIG. 5.

The adhesive tape 130 may be stretched according to the movement of the hook part 110. The upper end 131 of the adhesive tape 130 may be fixed to the hook part 110, and the lower end 132 of the adhesive tape 130 may be attached to the bonded surface. Therefore, since the adhesive tape 130 consequently is in a state of being fixed to the fixing portion 112 of the hook part 110, the adhesive tape 130 may be separated from the bonded surface.

The form of the attachment part 120 may be changed depending on adhesive strength of an adhesive of the adhesive tape 130 or film properties. For example, in a case in which the adhesive strength of the adhesive of the adhesive tape 130 or film ductility is relatively low, since the adhesive tape may also be detachable even with a relatively low extent of physical power, the attachment part 120 may only be detached by the movement of the hook part 110.

Figure 6:
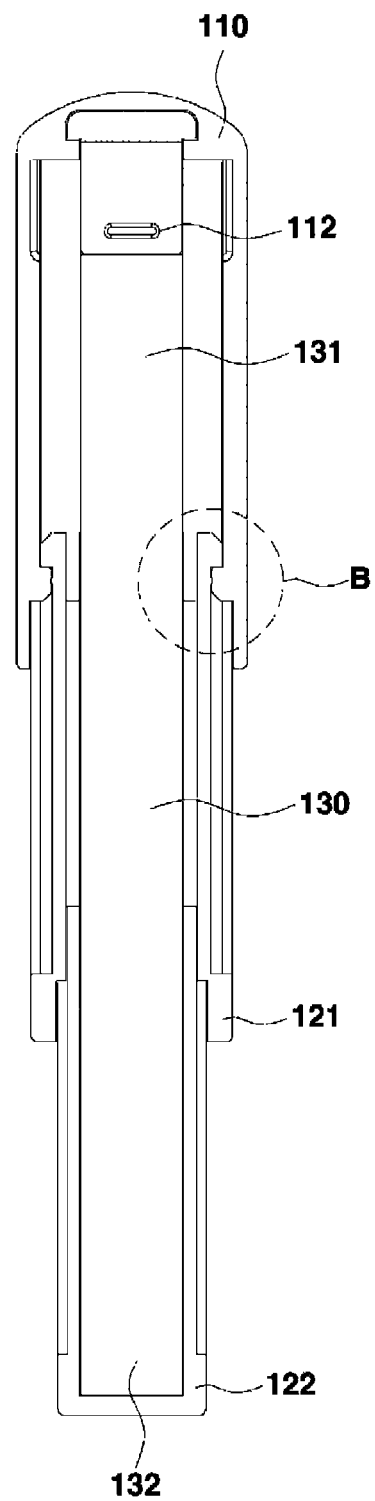
FIG. 6 is a view illustrating an adhesive tape of the hook assembly of FIG. 4.

However, in a case in which the adhesive strength of the adhesive of the adhesive tape 130 or film ductility is relatively high, it is anticipated that the lower end 132 of the adhesive tape may not be easily separated from the bonded surface 140. Therefore, as in the present exemplary embodiment of the present disclosure, physical power applied to the adhesive tape 130 may be increased by implementing the first and second attachment portions 121 and 122 to be able to significantly move the hook part 110 to which the adhesive tape 130 is fixed, so as to be further distanced therefrom. FIG. 6 is a view illustrating an adhesive tape of the hook assembly of FIG. 4. In comparing FIGS. 3 and 6, it can be appreciated that the adhesive tape 130 is stretched according to the movement of the hook part 110. Since the hook part 110 and the first attachment portion 121 are coupled to each other as illustrated in B of FIG. 6, the hook part 110 may not be separated from the hook assembly 100 while limiting the movement thereof.

In the exemplary embodiment of the present disclosure, two configurative elements, the first and second attachment portions 121 and 122, are implemented, but the number and shape thereof may be changed depending on adhesive strength of the adhesive tape 130, physical properties of a film, and the size or shape of the hook part 110. In addition, a position of a coupling portion A at which the first and second attachment portions 121 and 122 are coupled as illustrated in FIG. 5 and a position of a coupling portion B at which the hook part 110 and the first attachment portion 121 are coupled as illustrated in FIG. 6 may be changed to adjust a movement distance of the hook part 110, a stretched length of the adhesive tape 30, or the like.

Although the adhesive tape 130 is detached from the bonded surface 140 by moving the hook part 110 upwardly, for example, in a first direction in the present exemplary embodiment, unlike that, the adhesive tape 130 may also be detached through the movement in a second direction. This indicates that in a case in which the bonded surface 140 is a wall surface or the lie, by an operation of lifting the hook part 110 up, the adhesive tape 130 may be detached. Alternatively, unlike that, by implementing the hook part 110 and the attachment part 120 to be moved downwardly, the adhesive tape 130 may also be detached by an operating of moving the hook part 110 and the attachment part 120 to a lower part thereof.

Figure 7:
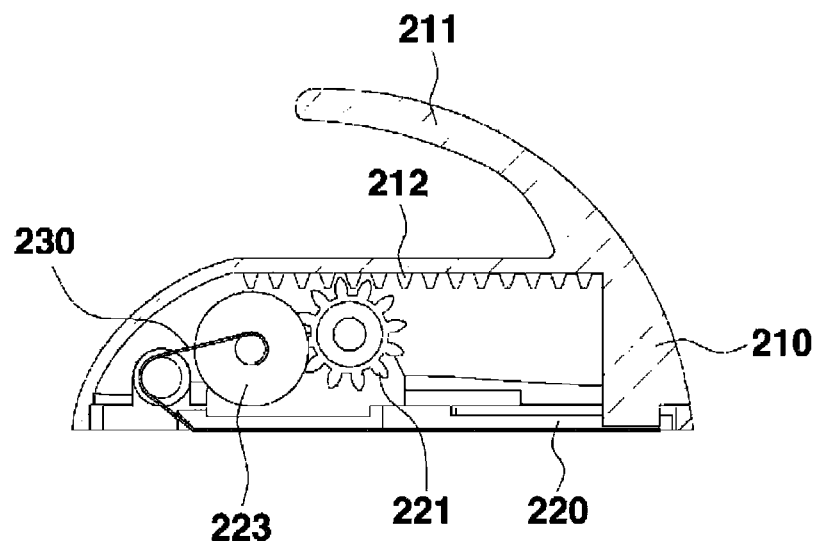
FIG. 7 illustrates a longitudinal cross section of a hook assembly according to another exemplary embodiment of the present disclosure.

FIG. 7 illustrates a longitudinal cross section of a hook assembly according to another exemplary embodiment of the present disclosure. In the exemplary embodiment of the present disclosure, a hook assembly 200 may include a hook including a hook part 210 containing a hook member 211 on which an object is hung to be supported thereby and an attachment part 220 attaching the hook part 210 to a bonded surface, and an adhesive tape 230 attaching the attachment part 220 to the bonded surface.

Figure 8:
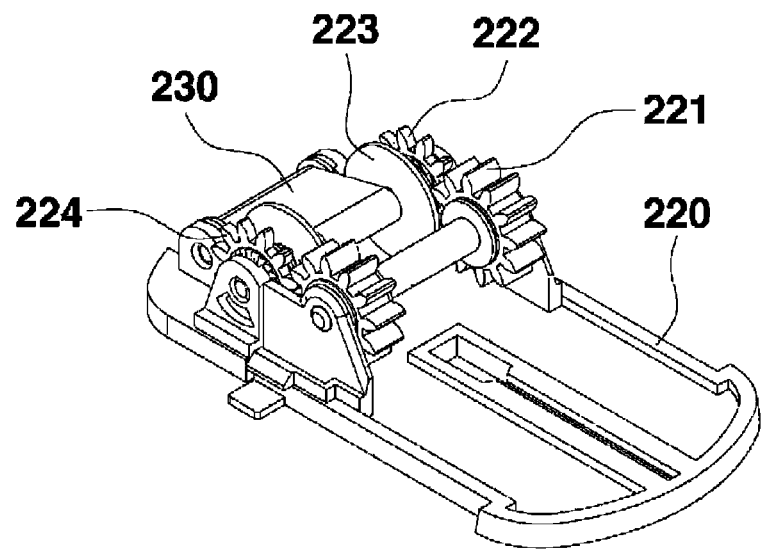
FIG. 8 illustrates an attachment part in the hook assembly of FIG. 7.

A saw-toothed part 212 may be formed inside the hook part 210. The saw-toothed part 212 may be implemented in such a manner as engaging with a first gear 221 provided with the attachment part 220. The attachment part 220 includes a second gear 222 provided therewith and operated by an operation of the first gear 221, and an upper end of the adhesive tape 230 may be fixed to a shaft 223 of the second gear 222 (see FIG. 8). For example, the first gear 221 engaging with the saw-toothed part 212 may be operated according to the operation of the hook part 210, and the second gear 222 may be operated by the first gear 221 to rotate the shaft 223 so as to allow the adhesive tape 230 to be wound around the shaft 223.

Figure 9:
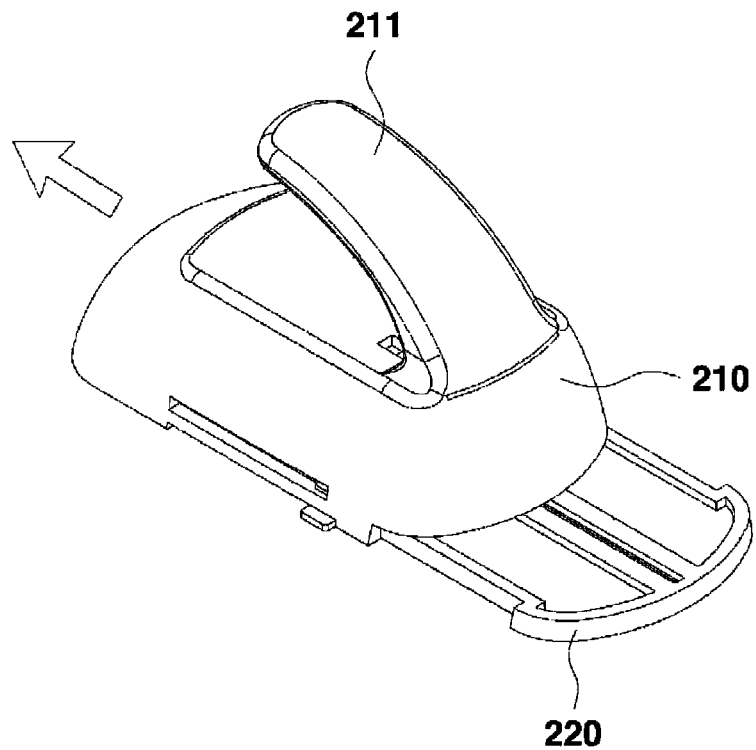
FIGS. 9 and 10 are views illustrating a hook assembly according to the movement of the hook part of the hook assembly illustrated in FIG. 7.
Figure 10:
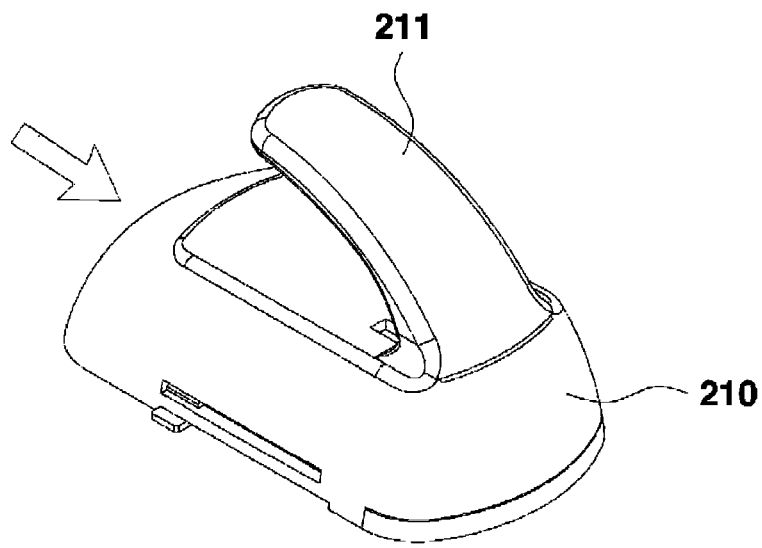

FIGS. 9 and 10 are views illustrating a hook assembly according to the movement of the hook part of the hook assembly illustrated in FIG. 7. When the hook part 210 is moved in a first direction as shown in an arrow of FIG. 9, the first gear 221 and the second gear 222 may be operated such that the adhesive tape 230 may be wound around the shaft 223. The adhesive tape 230 is in a state of being adhered to the bonded surface. When physical power greater than adhesive strength is applied thereto while the adhesive tape 230 is wound around the shaft 223 to be stretched, the adhesive tape 230 may be detached from the bonded surface.

Since a length of the saw-toothed part 212 is constant, a movement distance of the hook part 210 may be constant. Thus, when the hook part 210 moves in the first direction as shown in the arrow of FIG. 9 and moves by a maximum movement distance, the hook part 210 may be stopped. When the hook part 210 moves by a maximum movement distance in the first direction and stopped, the shaft 223 may be stopped by a stop part 224.

In a case in which the adhesive tape 230 is not separated from the bonded surface even after the hook part 210 moves by the maximum movement distance, the hook part 210 may be moved in a second direction as shown in an arrow of FIG. 10. The hook part 210 moves in the second direction and may move to an original position as illustrated in FIG. 10. The shaft 223 may be stopped by the stop part 224 while the hook part 210 is moving in the second direction.

When the hook part 210 is moved by the maximum movement distance in the second direction, the hook part 210 may be re-stopped, and may be re-moved in the first direction, and the adhesive tape 230 may be re-wound around the shaft 223 according to the operation of the first gear 221 and the second gear 222. In such a manner as described above, the movement of the hook part 210 in the first direction and the second direction may be repetitively performed until it is separated from the bonded surface.

Figure 11:
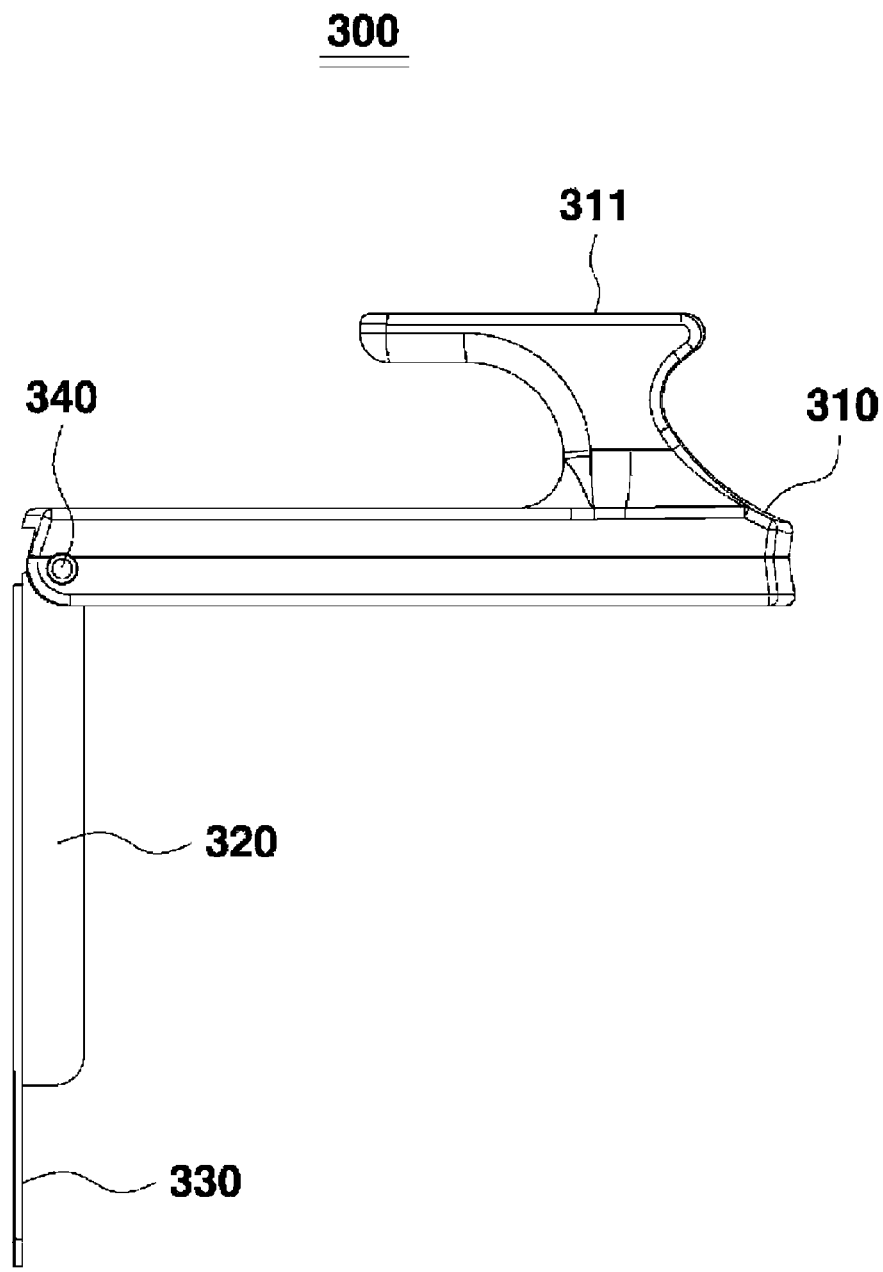
FIG. 11 is a cross-sectional view of a hook assembly according to another exemplary embodiment of the present disclosure.
Figure 12:
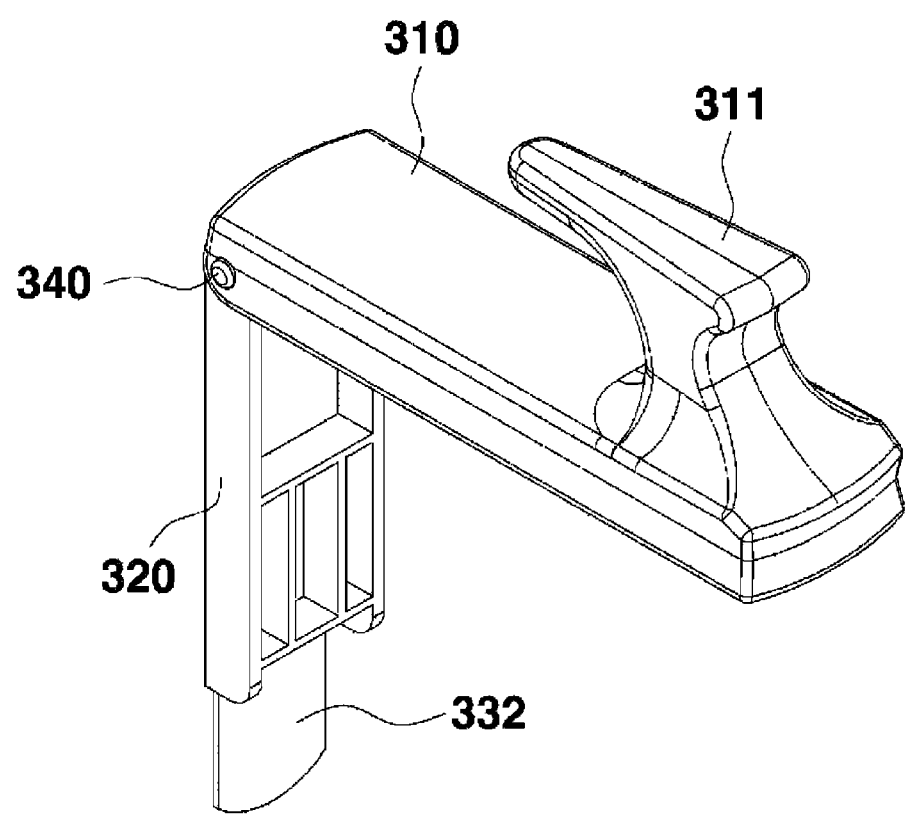
FIG. 12 is a perspective view of the hook assembly of FIG. 11.

FIG. 11 illustrates a longitudinal cross section of a hook assembly according to another exemplary embodiment of the present disclosure. FIG. 12 is a perspective view of the hook assembly of FIG. 11. In the exemplary embodiment of the present disclosure, a hook assembly 300 may include a hook including a hook part 310 containing a hook member 311 on which an object is hung to be supported thereby and an attachment part 320 attaching the hook part 310 to a bonded surface, and an adhesive tape 330 attaching the attachment part 320 to the bonded surface.

The hook part 310 may be fastened to the attachment part 320 using a hinge 340. The hook part 310 may be rotatably moved around the hinge 340. For example, the hook part 310 may be rotatably moved around the hinge 340 separately from the attachment part 320, and the hook part 310 may be upwardly lifted from the attachment part 320 attached to the bonded surface according to the exemplary embodiment of the present disclosure. As illustrated in FIGS. 11 and 12, the hook part 310 may form an angle of about 90 degrees with respect to the bonded surface, but the angle formed by the hook part 310 and the attachment part 320 or the bonded surface may be smaller or greater than 90 degrees. The angle of the hook part 310 with respect to the attachment part 320 or the bonded surface may be formed to an extent to which the hook part 310 may be separately moved from the attachment part 320 to allow for a portion of the adhesive tape 330 to be exposed to the outside so as to be able to be removed.

With reference to FIG. 12, a portion of the adhesive tape 330 may be exposed downwardly of the attachment part 320. For example, a lower end 332 of the adhesive tape 330 may be exposed to the outside. Therefore, the adhesive tape 330 may be removed using an exposed portion thereof to thereby remove the hook assembly 300 from the bonded surface. The exposed lower end 332 of the adhesive tape 330 may be provided as a handle portion used for the removal of the adhesive tape 330 with an adhesive surface or without an adhesive surface thereon. Alternatively, for convenience of removal of the adhesive tape 330, the lower end 332 of the adhesive tape may be a handle portion of a stretch releasable adhesive tape able to be easily removed by pulling the lower end of the adhesive tape to be stretched such that adhesive strength of the adhesive tape 330 may be reduced.

In the case of the hook assembly 300 according to the present exemplary embodiment, the case in which the hook part 310 is upwardly lifted from the attachment part 320 to be moved in one direction is implemented, but unlike that, the hook part may also be lowered while rotatably moving from the attachment part to a lower part thereof and an upper end of the adhesive tape is then exposed to the outside such that the adhesive tape may be removed using the outwardly exposed region.

Alternatively, since the hook assembly may be used to support relatively simple and light objects, the size of the hook assembly may be relatively small. Therefore, in this case, the upwardly lifted hook part may be moved horizontally, for example, to the right or the left, and a user may thus easily recognize an exposed portion of the adhesive tape. To this end, in the hinge to which the hook part and the attachment part are coupled, as a configuration in which a portion is detachable, a configuration in which a right portion is detached from the hinge when the hook part is moved to the left, and a left portion is detached from the hinge when the hook part is moved to the right may be further included.

Figure 13:
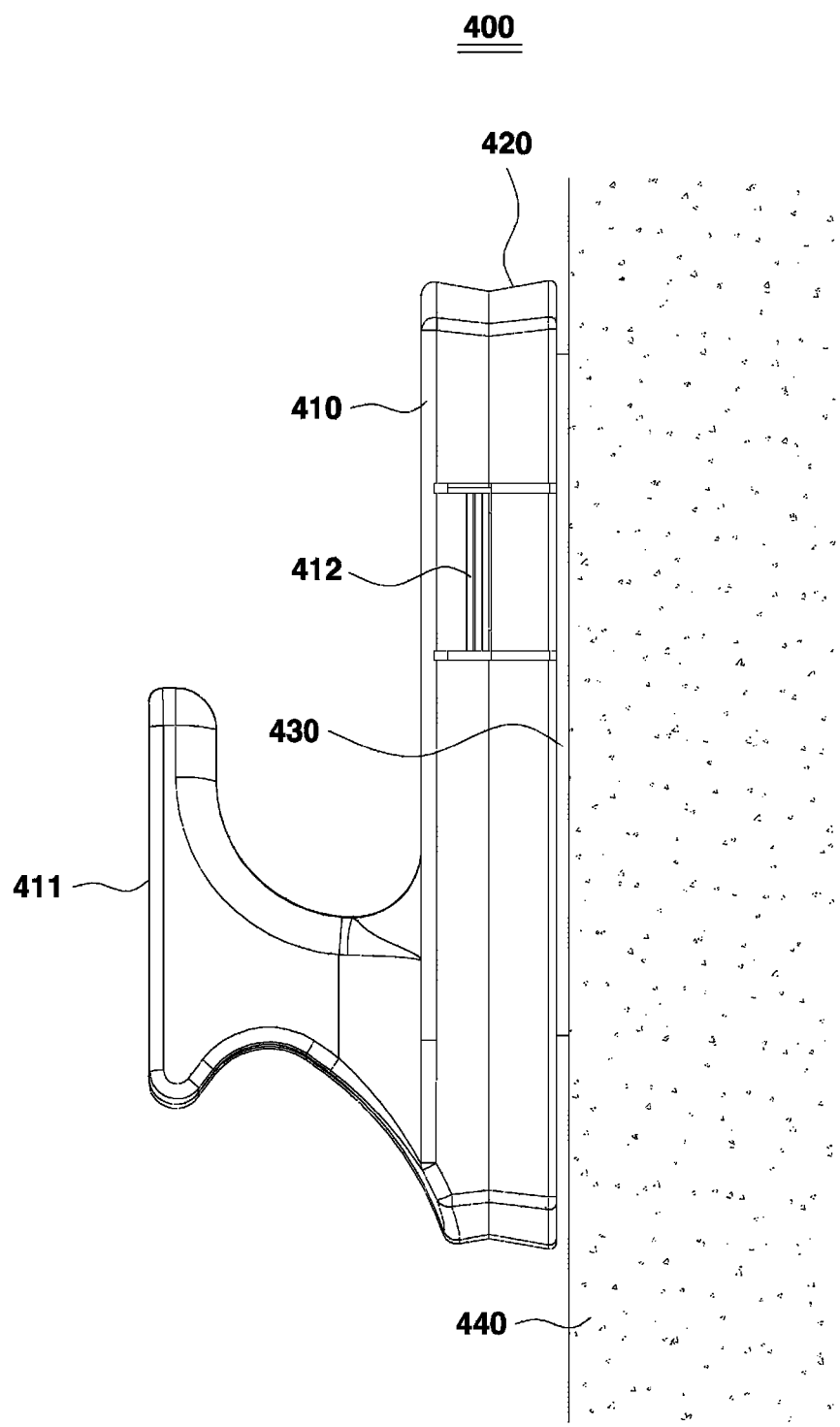
FIG. 13 illustrates a longitudinal cross section of a hook assembly according to another exemplary embodiment of the present disclosure.
Figure 14:
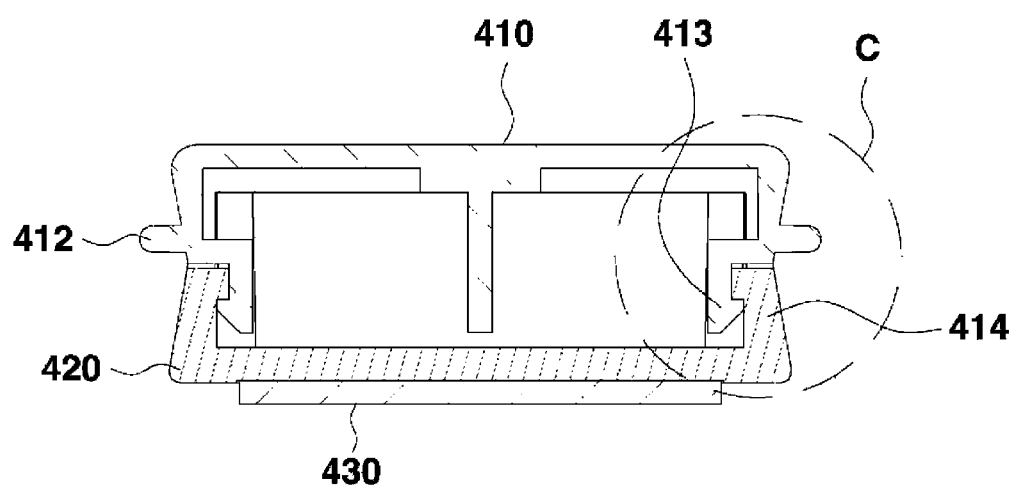
FIG. 14 is a cross-sectional view of the hook assembly shown in FIG. 13.

FIG. 13 illustrates a longitudinal cross section of a hook assembly according to another exemplary embodiment of the present disclosure, and FIG. 14 is a cross-sectional view of the hook assembly of FIG. 13. According to another exemplary embodiment of the present disclosure, a hook assembly 400 may include a hook including a hook part 410 containing a hook member 411 on which an object is hung to be supported thereby and an attachment part 420 attaching the hook part 410 to a bonded surface 440, and an adhesive tape 430 attaching the attachment part 420 to the bonded surface 440.

Figure 15:
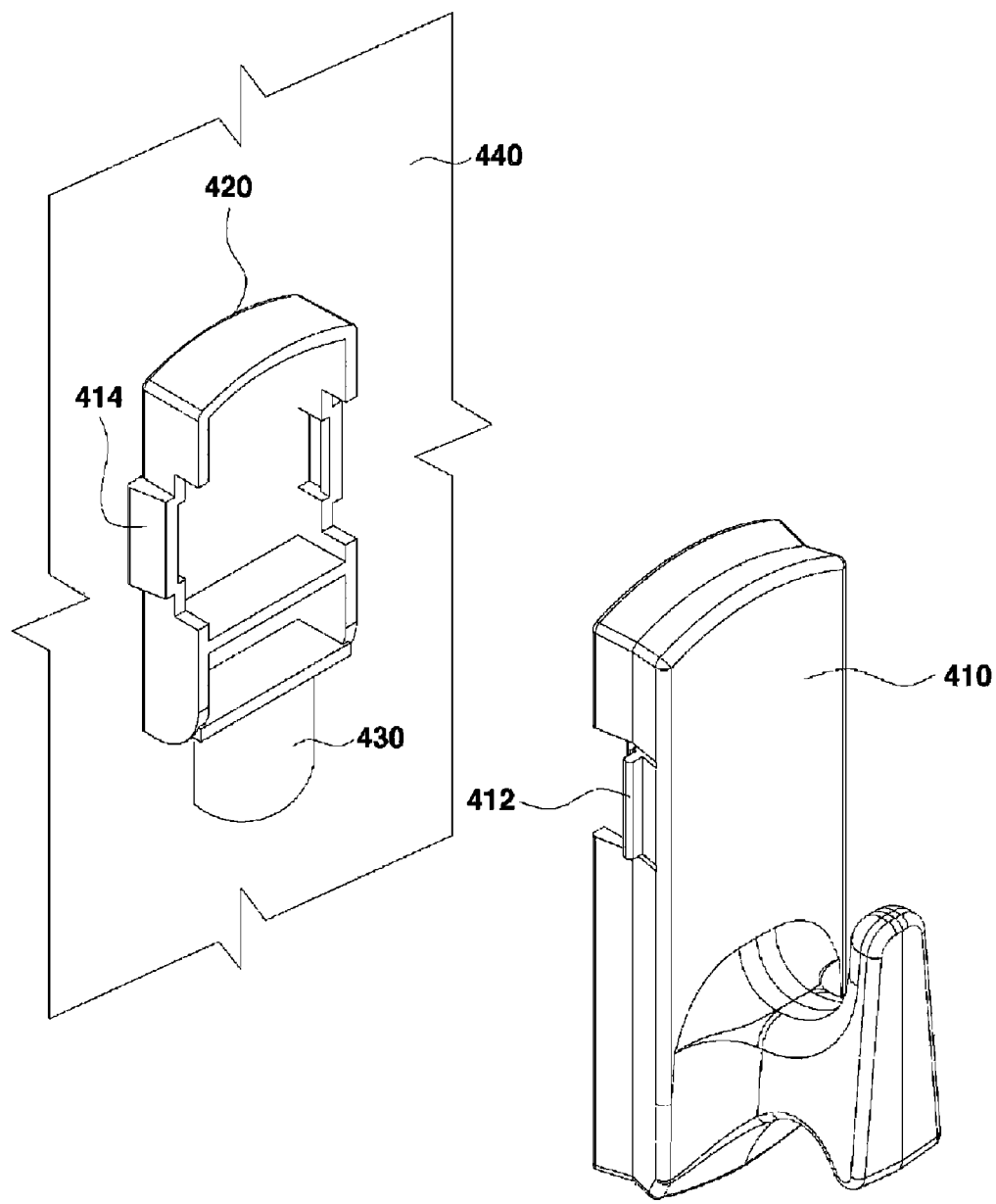
FIG. 15 is a view illustrating a hook part separated from the hook assembly of FIG. 13.

The hook part 410 may be fastened to the attachment part 420 in a form of being interlocked with each other, in a hook form as illustrated in C of FIG. 14. When force is applied to a protrusion 412 formed on the hook part 410, a hook-part hook 413 may be separated from an attachment-part hook 414 in C of FIG. 14. The hook part 410 may be easily separated from the attachment part 420. FIG. 15 illustrates a state in which the hook part 410 is separated from the attachment part 420. The attachment part 420 may be attached to the bonded surface 440, and the hook part 410 may be completely separated from the attachment part 420. The adhesive tape 430 may be exposed downwardly of the attachment part 420 according to the separation of the hook part 410. The exposed adhesive tape 430 may be easily removed as illustrated in FIGS. 11 and 12. Although FIG. 15 illustrates that the entirety of the hook part 410 is detached, unlike that, here only a portion of the hook part may be separated.

Figure 16:
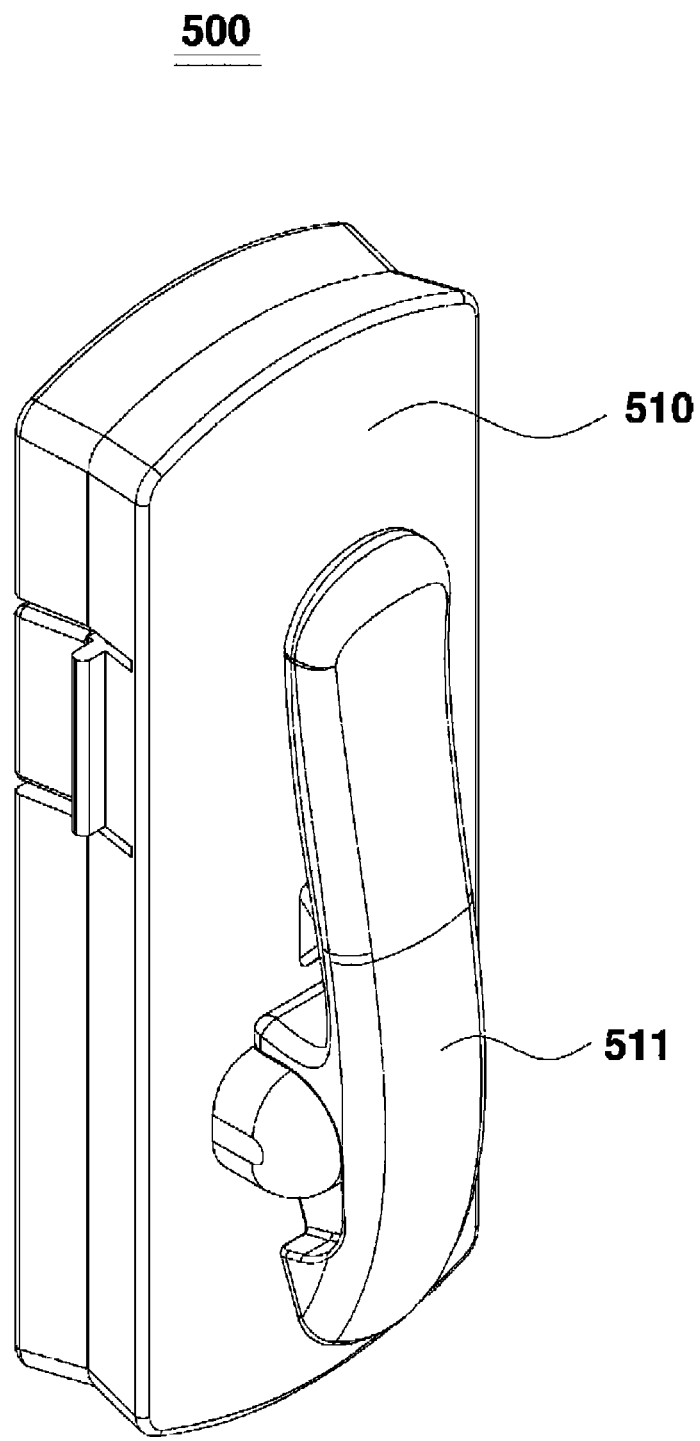
FIG. 16 is a perspective view of a hook assembly according to another exemplary embodiment of the present disclosure.

FIG. 16 is a perspective view of a hook assembly according to another exemplary embodiment of the present disclosure. A hook assembly 500 may include a hook member 511 on which an object may be hung to be supported thereby, the hook member 511 being provided with a hook part 510.

Figure 17:
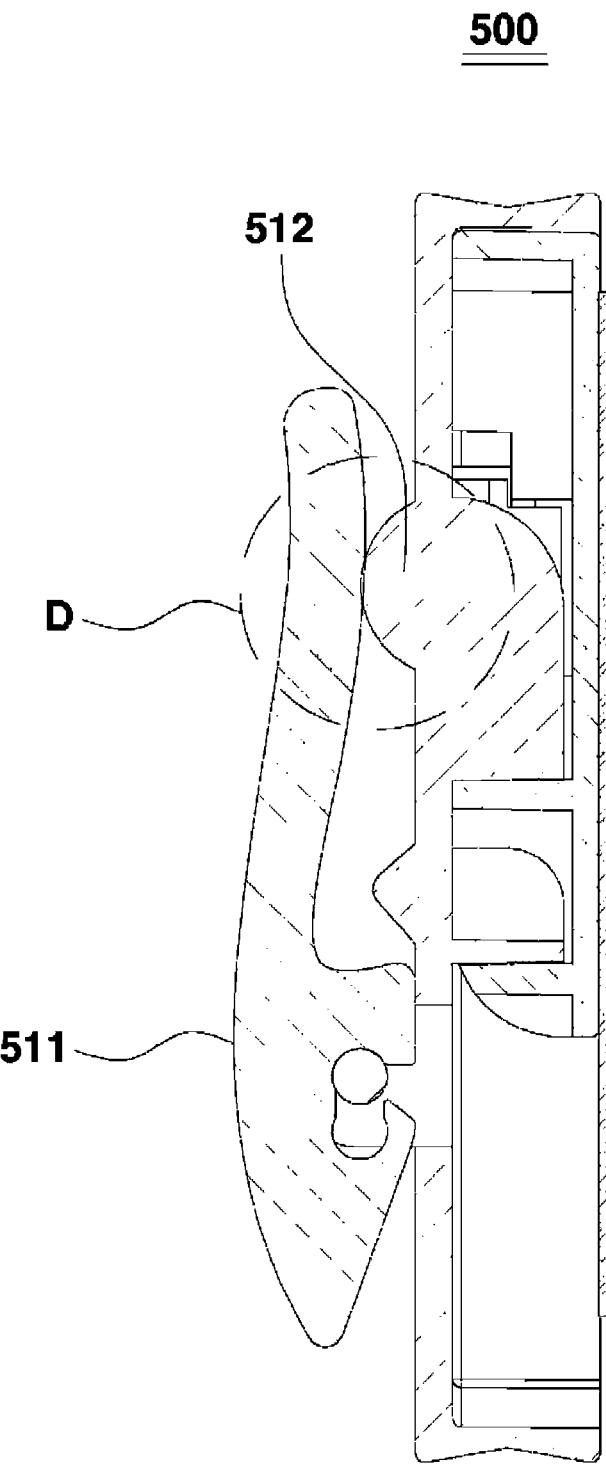
FIG. 17 illustrates a longitudinal cross section of the hook assembly of FIG. 16.

FIG. 17 illustrates a longitudinal cross section of the hook assembly 500 according to the exemplary embodiment of the present disclosure. An end portion of the hook member 511 may contact a protrusion 512 formed on a surface of the hook part 510. For example, the hook member 511 may be used in the form of a clip. A clip-type hook D according to the present exemplary embodiment may have the form of a clip capable of supporting a relatively light and thin object such as scratch paper or a picture.

Figure 18:
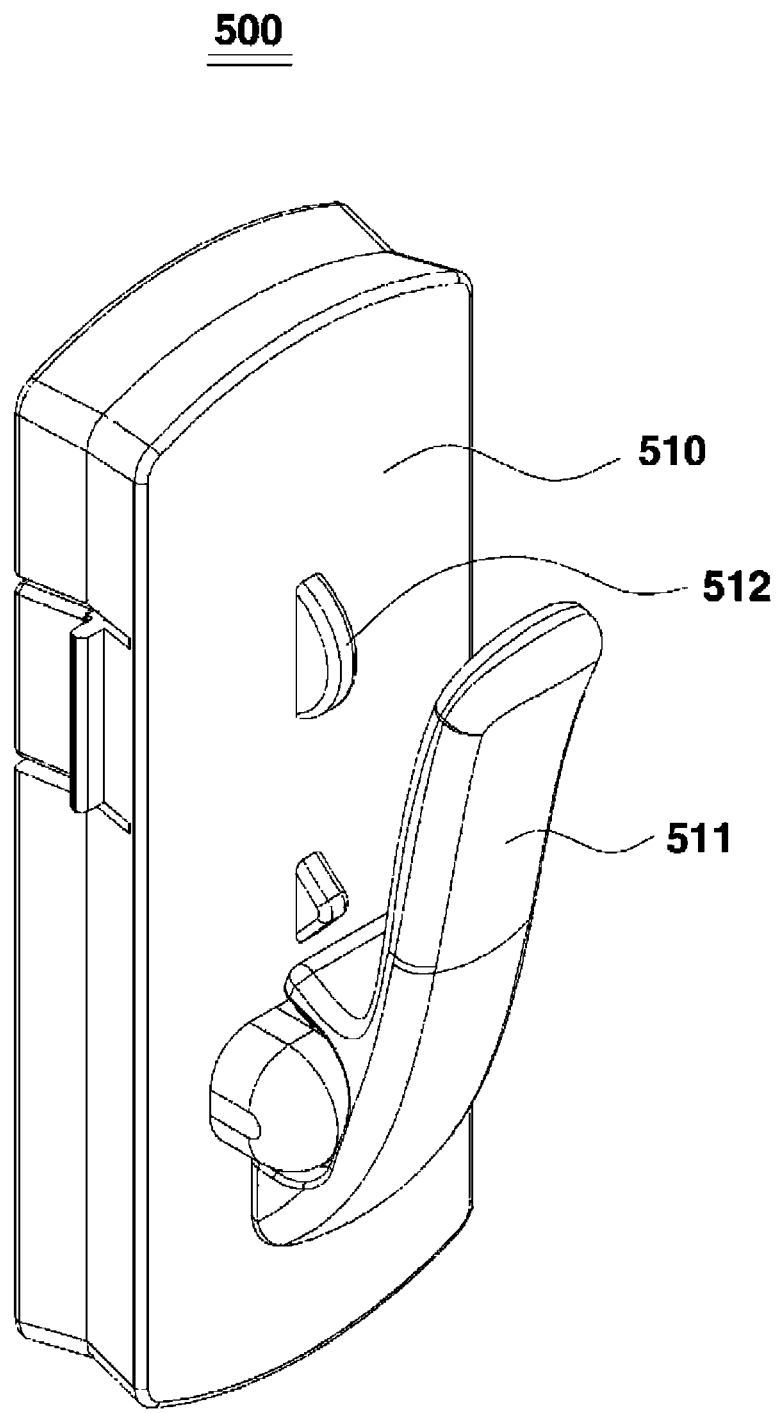
FIG. 18 is a perspective view illustrating a modified example of a hook member of the hook assembly shown in FIG. 16.
Figure 19:
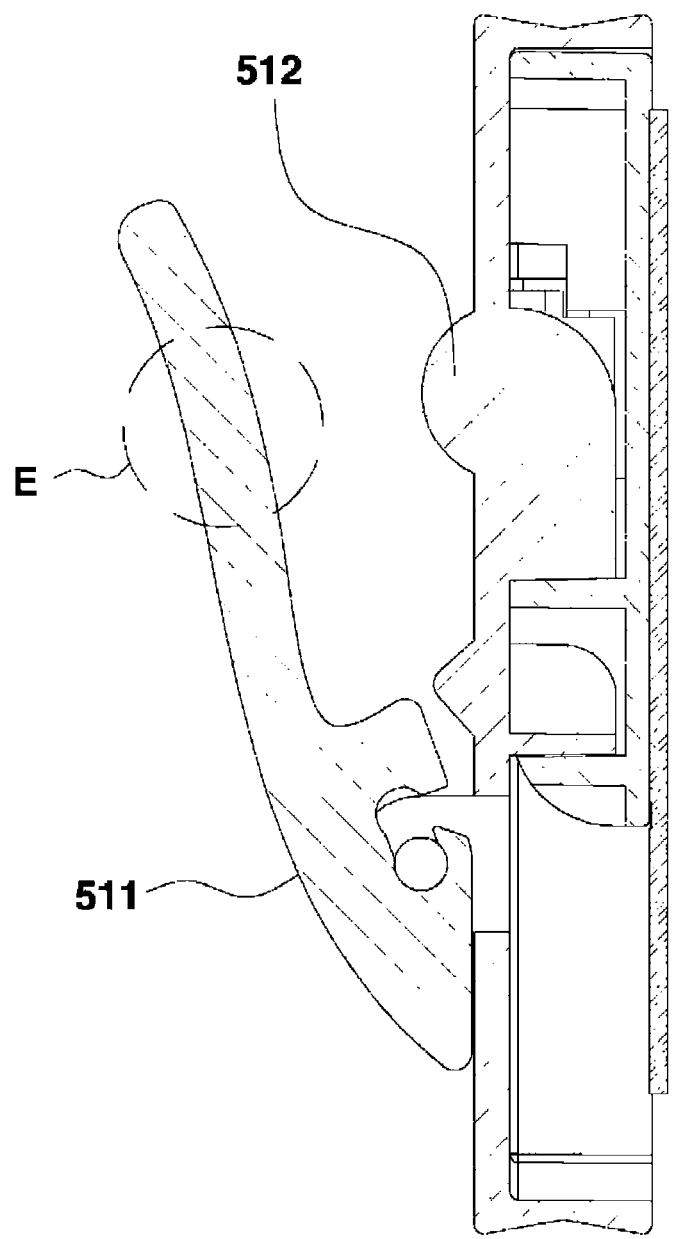
FIG. 19 illustrates a longitudinal cross section of the hook assembly of FIG. 18.

Unlike that, when the clip-type hook D is spread downwardly, it may become a hook-type member E. FIGS. 18 and 19 illustrate the hook-type member E. In detail, in the present exemplary embodiment, the hook member 511 of the hook part 510 on which an object is hung to be supported thereby may be converted into two types, a clip type and a hook type. The hook-type member E may be used in such a manner as holding an end portion of the clip-type hook D in a user's hand and pulling the end portion of the clip-type hook D so as to be downwardly moved and then fixed so as not to be in contact with the protrusion 512. Objects such as keys or cloths may be hung on the hook-type member E. Therefore, in the case of the hook assembly 500 according to the exemplary embodiment of the present disclosure, a shape of the hook member 511 may be changed depending on a kind of target objects to be supported thereby such that the hook assembly may be variously used.

Figure 20:
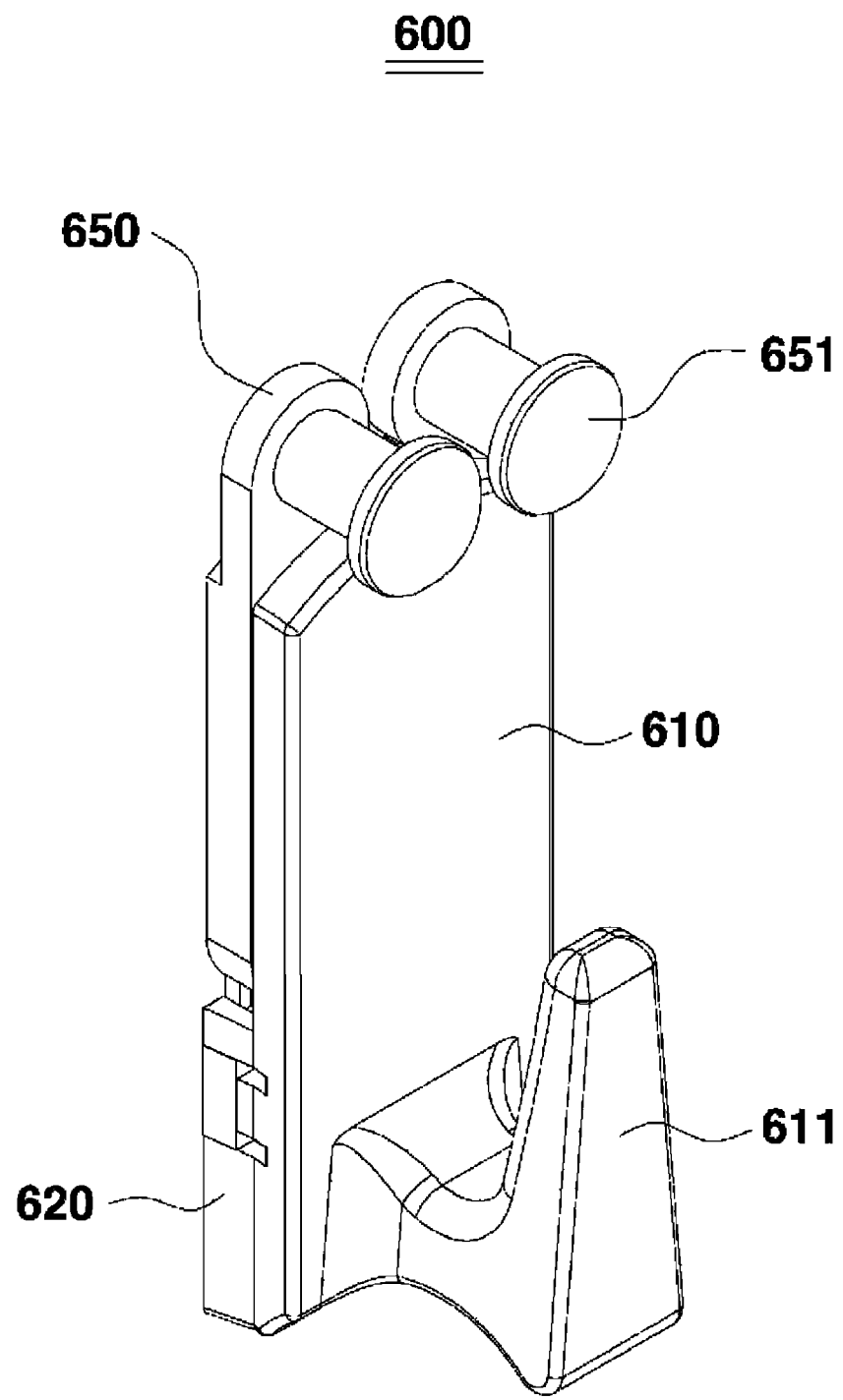
FIG. 20 is a perspective view of a hook assembly according to another exemplary embodiment of the present disclosure.
Figure 21:
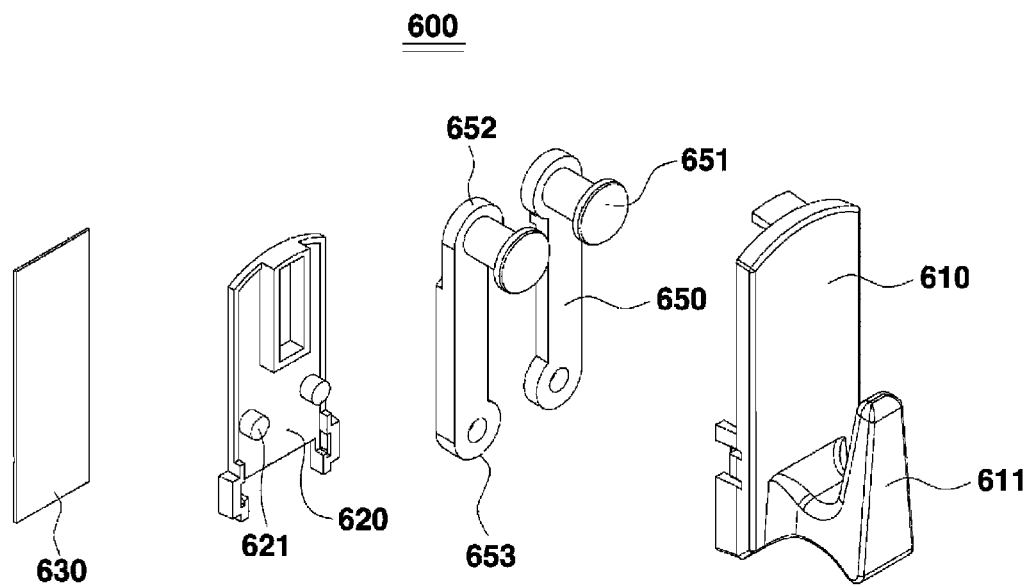
FIG. 21 is an exploded perspective view of the hook assembly of FIG. 20.
Figure 22:
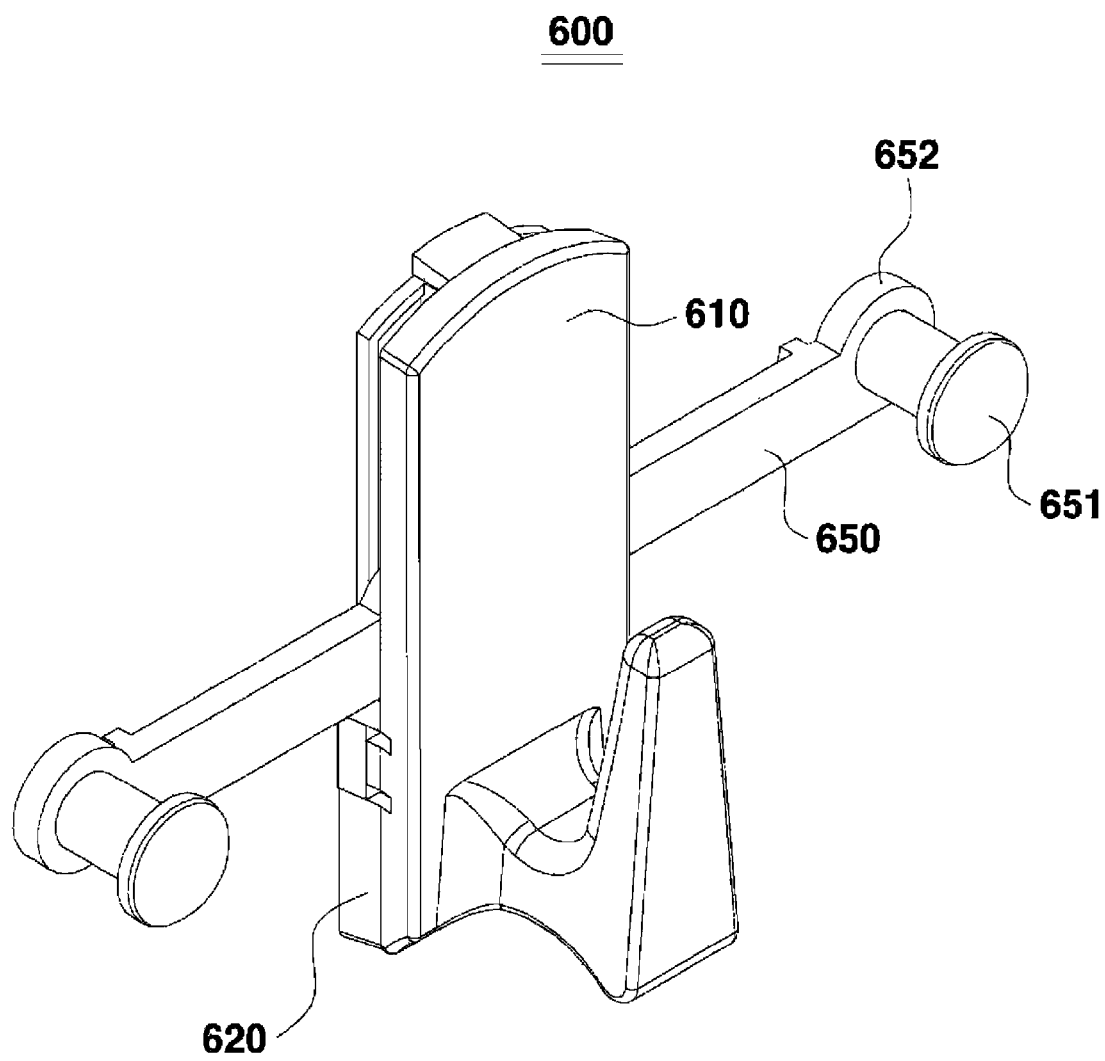
FIG. 22 is a perspective view illustrating an operation of the hook assembly of FIG. 20.

FIG. 20 is a perspective view of a hook assembly according to another exemplary embodiment of the present disclosure, FIG. 21 is an exploded perspective view of the hook assembly of FIG. 20, and FIG. 22 is a perspective view illustrating an operation of the hook assembly of FIG. 20. A hook assembly 400 according to another exemplary embodiment of the present disclosure may include a hook including a hook part 610 containing a hook member 611 on which an object is hung to be supported thereby and an attachment part 620 attaching the hook part 610 to a bonded surface, and an adhesive tape 630 attaching the attachment part 620 to the bonded surface.

In the exemplary embodiment of the present disclosure, the hook may further include an auxiliary hook part 650 provided with a peg 651 formed on a first end portion 652 thereof. With reference to FIG. 21, the auxiliary hook part 650 may be disposed between the hook part 610 and the attachment part 620. The auxiliary hook part 650 may be fastened to at least one of the attachment part 620 and the hook part 610 through a hinge 621, and FIG. 21 illustrates a case in which the auxiliary hook part 650 is fastened to the attachment part 620 using the hinge 621.

A second end portion 653 of the auxiliary hook part 650 may be fastened to the attachment part 620 through the hinge 621, and when the auxiliary hook part 650 is not used as illustrated in FIG. 20, the auxiliary hook part 650 may be placed thereabove. When the auxiliary hook part 650 is positioned thereabove, a support target object may only be hung on the hook member 611. The peg 651 formed on the first end portion 652 of the auxiliary hook part 650 may be positioned in an upper part to be located above the hook member 610.

When the peg 651 of the auxiliary hook part 650, for example, two pegs, are used, the first end portions 652 of the auxiliary hook parts 650 may be downwardly moved to be directed toward the outside such that the pegs 651 of the hook assembly 600 may be spread. Thus, all of the hook member 611 and the pegs 651 may be used. FIG. 22 illustrates a case in which both of pegs 651 are spread, but only one peg 651 may be spread and the other peg 651 may not be spread to be maintained in a state in which it is directed upwardly as illustrated in FIG. 20, such that the hook assembly 600 may serve as a hook assembly including a total of two hooks, for example, hook parts, as necessary.

Although the case in which the auxiliary hook part 650 of the hook assembly 600 includes a total of two auxiliary hooks, for example, two pegs 651, is illustrated according to the exemplary embodiment of the present disclosure, a single auxiliary hook, or two or more auxiliary hooks may be applied depending to the form of the auxiliary hook part 650.

As set forth above, with a hook assembly according to exemplary embodiments of the present disclosure, an adhesive tape may be separated from a bonded surface without directly touching the adhesive tape attached to the bonded surface and may be detached without removing an upper plate on which a hook of the hook assembly is located, such that it may be easily removed from the bonded surface. In addition, the upper plate may be upwardly lifted or separated from the bonded surface in one touch scheme so as to easily expose and remove the adhesive tape. Accordingly, the hook assembly separated from the bonded surface may be re-used and the external appearance thereof may be beautiful since the adhesive tape is not exposed.

Further, a hook assembly according to some embodiments of the present disclosure may be variously used depending on a kind of objects through simple manipulation, for example, by converting a hook into a hook-type member when an object is a heavy article and into a clip-type hook when an object is a light article. In addition, the hook assembly may further include a hook part such that auxiliary hooks may be spread as a wing form so as to hang a plurality of objects thereon as need, and thus several hook assemblies may not be used, thereby reducing costs.

While exemplary embodiments have been shown and described above, it will be apparent to those skilled in the art that modifications and variations could be made without departing from the spirit and scope of the present disclosure as defined by the appended claims.

What is claimed is:

1. A hook assembly comprising:
   a hook part containing a hook member on which an object is hung to be supported;
   an attachment part attaching the hook part to a bonded surface; and
   an adhesive tape attaching the attachment part to the bonded surface,
   wherein the hook part comprises a cover portion, an upper side portion extending from the cover portion, a protrusion protruded from the upper side portion and a hook-part hook formed opposite the protrusion, the hook-part hook comprising a traverse portion, a longitudinal portion crossed to the traverse portion, and an end portion formed in an L-shape,
   the attachment part comprises a bottom portion, a lower side portion extending from the bottom portion, and an attachment-part hook being tapered upwardly from the bottom portion, the attachment-part hook being formed along the lower side portion is opposite the upper side portion of the cover portion, and
   the attachment-part hook is coupled to the hook-part hook, the hook-part hook being released from the attachment-part hook when the protrusion is pressed.

2. The hook assembly of claim 1, wherein an upper end of the adhesive tape is fixed to the hook part.

3. The hook assembly of claim 2, wherein the adhesive tape is detached from the bonded surface when the hook part is moved in a first direction.

4. The hook assembly of claim 1, wherein the hook part comprises a saw-toothed part, the attachment part comprises a first gear having a shape engaging with the saw-toothed part and a second gear operated by the first gear, and an upper end of the adhesive tape is fixed to a shaft of the second gear.

5. The hook assembly of claim 4, wherein the adhesive tape is wound around the shaft of the second gear when the hook part is moved in the first direction to operate the second gear by the first gear engaging with the saw-toothed part, to then be detached from the bonded surface.

6. The hook assembly of claim 5, wherein when the hook part is moved in the first direction and then stopped, the hook part moves in a second direction, and when the hook part is moved in the second direction and then stopped, the hook part re-moves in the first direction.

7. The hook assembly of claim 6, wherein the shaft of the second gear is stopped by a stop part as the hook part is moved in the first direction and then stopped, and maintains a stop state until the hook part is moved in the second direction and then stopped.

8. The hook assembly of claim 7, wherein the hook part moves until the adhesive tape is detached from the bonded surface.

9. The hook assembly of claim 1, wherein the hook part is fastened to the attachment part using a hinge.

10. The hook assembly of claim 9, wherein the hook part moves around the hinge to allow for a lower end of the hook part to be separated from the bonded surface.

11. The hook assembly of claim 10, wherein the attachment part is formed to expose a portion of the adhesive tape to the outside when the hook part is moved.

12. The hook assembly of claim 1, wherein the attachment part is provided to expose a portion of the adhesive tape when the hook part is separated from the bonded surface.

13. The hook assembly of claim 1, wherein the hook member is a clip-type hook.

14. The hook assembly of claim 13, wherein the hook member is converted into a hook-type member when the clip-type hook is spread.

15. The hook assembly of claim 1, wherein the hook further comprises an auxiliary hook part provided with a peg formed on a first end portion of the auxiliary hook part.

16. The hook assembly of claim 15, wherein the auxiliary hook part is disposed between the hook part and the attachment part, and at least one of the attachment part and the hook part is fastened to a second end port of the auxiliary hook part through a hinge.

17. The hook assembly of claim 16, wherein in the auxiliary hook part, when the auxiliary hook part rotatably moves based on the second end portion, the first end portion is spread aside.

18. The hook assembly of claim 17, wherein the auxiliary hook part is disposed between the attachment part and the hook part when the spread first end portion is rotatably moved based on the second end portion.

19. The hook assembly of claim 1, wherein the protrusion has a rounded end.

* * * * *